No. 676,363.  
C. F. HALDEMAN.  
CONVERTIBLE DEVICE FOR RIVETING AND SAW SETTING.  
(Application filed Apr. 1, 1899.)  
Patented June 11, 1901.
(No Model.)
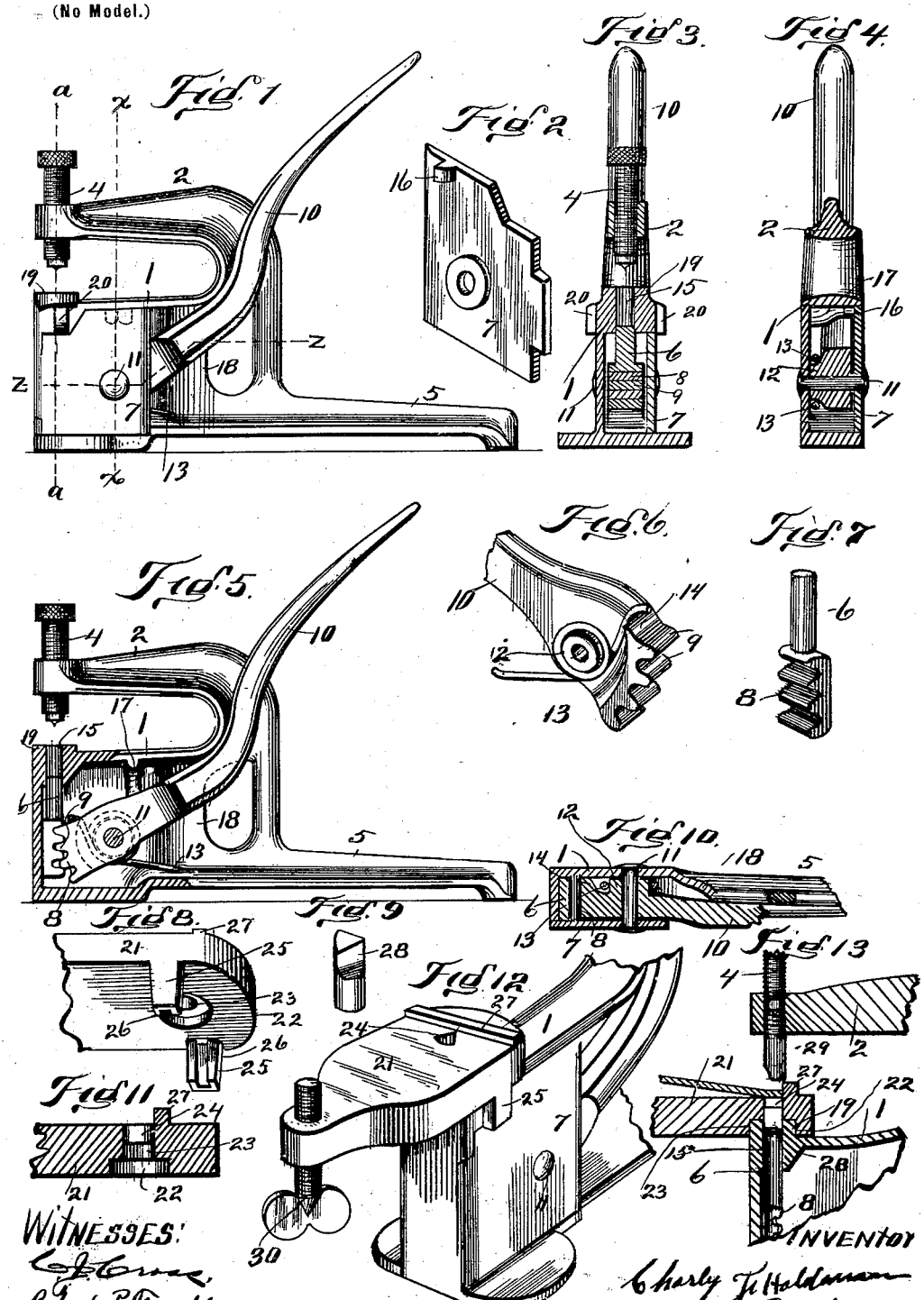

UNITED STATES PATENT OFFICE.

CHARLEY F. HALDEMAN, OF SALEM, OHIO, ASSIGNOR TO THE SHEEHAN MANUFACTURING COMPANY, OF SAME PLACE.

CONVERTIBLE DEVICE FOR RIVETING AND SAW-SETTING.

SPECIFICATION forming part of Letters Patent No. 676,363, dated June 11, 1901.

Application filed April 1, 1899. Serial No. 711,392. (No model.)

*To all whom it may concern:*

Be it known that I, CHARLEY F. HALDEMAN, a citizen of the United States, residing at Salem, in the county of Columbiana and State of Ohio, have invented certain new and useful Improvements in Convertible Devices for Riveting and Saw-Setting; and I do hereby declare that the following is a full, clear, and exact description of the same, reference being had to the annexed drawings, making a part of this specification, and to the figures of reference marked thereon, in which—

Figure 1 is a side elevation. Fig. 2 is a detached view of the plate. Fig. 3 is a section on line $a\,a$, Fig. 1. Fig. 4 is a section on line $x\,x$, Fig. 1. Fig. 5 is a side elevation showing the plate removed. Fig. 6 is a view showing the inner end of the operating handle or lever and illustrating the spring connected thereto. Fig. 7 is a detached view of the plunger. Fig. 8 is a view showing a portion of the saw-setting plate. Fig. 9 is a detached view of the lower saw-setting die. Fig. 10 is a view on line $z\,z$, Fig. 1. Fig. 11 is a sectional view of the saw-setting bed. Fig. 12 is a view showing the saw-setting bed placed in position for use, showing the upper portion of the frame broken away. Fig. 13 is a view showing the saw-setting bed in condition and the upper and lower saw-setting dies placed in operative position.

The present invention has relation to convertible riveting and saw-setting tools; and it consists in the different parts and combination of parts hereinafter described, and particularly pointed out in the claim.

Similar numerals of reference indicate corresponding parts in all the figures of the drawings.

In the accompanying drawings, 1 represents the body, which is substantially of the form shown, and, as shown, it is provided with the upward-extended curved arm 2, which is provided with a screw-threaded aperture to receive the die 4, which die is located as illustrated in the drawings.

For the purpose of providing a proper support for the body 1 the arm 5 is extended rearward, as illustrated in the drawings, and is formed integral with the body 1.

At the front end of the body 1 is located the plunger 6, which plunger is held in position by said body and the removable plate 7, which plate is located and arranged as illustrated in Fig. 1.

The bottom or lower portion of the plunger 6 is provided with the teeth or cogs 8, which teeth or cogs engage with the teeth or cogs 9, formed upon the inner end of the operating lever or handle 10.

The operating lever or handle 10 is pivotally connected to the body 1 by means of the cross-bolt or rivet 11, which cross-bolt or rivet is located and arranged substantially as shown in the drawings.

Upon one side of the operating lever or handle 10 is formed the flange or boss 12, around which flange is located the lope or spring 13, one end of said spring being engaged with the flange 14, formed upon the end of the operating handle or lever, and the other end of said spring resting and bearing upon the bottom of the body 1 and upon the upper side thereof. The spring 13 is for the purpose of automatically elevating the lever or handle 10 after said handle has been depressed to elevate the plunger.

The plunger 6 is formed of such a length that when the operating handle or lever 10 is elevated the upper end of the plunger 6 will come a short distance below the upper end of the aperture 15, which aperture is for the purpose of holding a rivet and for the additional purpose hereinafter described.

In use the die 4 is adjusted up and down to correspond with the thickness of the material designed to be riveted.

The object and purpose of providing the detachable plate 7 is to provide a means for casting the body without the use of a core, by which arrangement the cost of manufacture is greatly reduced.

The plate 7 is held in proper position by means of the cross-bolt or rivet 11, through which plate said cross-bolt or rivet is placed. For the purpose of preventing any backward movement of the plate the said plate is provided with the lug 16, which lug is located against the flange 17 when said plate is brought into its normal position.

For the purpose of providing a guide to assist in holding the operating handle or lever 10 the body 1 is provided with the curved flange 18, which flange also strengthens the body 1.

It will be understood that by attaching the plate 7, as described, the body 1 can be cast without a core, thereby greatly reducing the expense of manufacturing.

For the purpose of providing a combined saw-set and riveting-tool the portion of the body 1 directly below the end of the curved arm 2 and below the die 4 is provided with the upward-extended portion 19 and the flanges 20, which upward-extended portion 19 and the flanges 20 are for the purpose of holding the plate 21 in proper position and in the position shown in Fig. 12. The plate 21 is provided with the open socket 22, which open socket is for the purpose of receiving the extended portion 19. Above the socket 22 is formed the opening 23 and above said opening is located the angular opening 24. The plate 21 is provided with the downward-extending flanges or arms 25, which arms are provided with the grooves 26, which grooves are for the purpose of overlapping the flanges 20, thereby holding the plate in a fixed position. The upper side of the plate 21 is provided with the flange 27, which flange is for the purpose of holding the teeth of the saw in proper position to be acted upon by the dies 28 and 29.

In order to convert the riveting-tool into a saw-set, the plate 21 is placed in the position illustrated in Fig. 12, the die 28 having been placed in proper position and in the position illustrated in Fig. 13. The upper die 29 is also placed in the position illustrated in Fig. 13, after which the die 4 is brought down to assist in holding the die 29.

In order to adjust the pitch of the saw-teeth, the set-screw 30 is provided, which set-screw is elevated or lowered, so as to hold the saw-blade in the proper inclination, said inclination being adjusted by the adjustment of the set-screw 30.

For the purpose of preventing the die 28 from becoming displaced or turned out of position with reference to a saw-tooth the upper end of said die is formed angular and said angular end fitted into the angular opening 24, formed in plate 21.

For the purpose of regulating the pitch of the saw-teeth the blade of the saw is placed in the position illustrated in Fig. 13 and said blade elevated at its back, thereby bringing the teeth of the saw at an angle between the die and plunger, and when the plunger is brought up the tooth located between the die and plunger will be brought into a position parallel with the under face of the die and the upper face of the plunger.

For the purpose of holding the saw-plate at the desired angle the adjusting-screw 30 is provided, which adjusting-screw holds the plate. It will be understood that the blade should be held down and upon the upper end of the screw 30, when the plunger and its die is brought up against the under side of the tooth designed to be set.

Having fully described my invention, what I claim as new, and desire to secure by Letters Patent, is—

The combination of a body provided with flanges 20, a plate provided with grooved arms or flanges, said plate provided with an adjustable set-screw, a flange formed upon the upper side of the plate, a pivoted handle or lever connected to the body and provided with teeth, a plunger carrying a die upon its upper end and an adjustable die located above the plunger and die carried by the plunger, substantially as and for the purpose specified.

In testimony that I claim the above I have hereunto subscribed my name in the presence of two witnesses.

CHARLEY F. HALDEMAN.

Witnesses:
ROBERT P. TRIMBLE,
WM. J. GLASS.